Nov. 4, 1952

C. F. WOLTERS 2,616,430

INDEX AND SIGNAL

Filed May 17, 1945

Inventor

Carl F. Wolters

By Roland T. Booth

Attorney

Patented Nov. 4, 1952 2,616,430

UNITED STATES PATENT OFFICE 2,616,430

INDEX AND SIGNAL

Carl F. Wolters, Kenmore, N. Y., assignor to Remington Rand Inc., Buffalo, N. Y, a corporation of Delaware Application May 17, 1945, Serial No. 594,331

5 Claims. (Cl. 129—16.7)

This invention relates to a graphic signal for visible index equipment, and it has particular reference to the provision of an indexed record incorporating signal members which may be displayed across the entire face of the record cards.

It has heretofore been proposed to provide visible card records in the form of card holders having pockets along their edges for receiving an index card with an index on a margin of the card that is normally visible. A signalling means for the index in the form of a strip of plastic material is mounted for sliding movement lengthwise of the visible margin of the card. In this manner, the status of the data on the card may be quickly determined by glancing at the position of the signal, and changes in such status may be reflected by progressively sliding the strip to a new appropriate position. An objection to these devices has existed, however, in the fact that the length of the strip signal is limited by the width of the card pocket, and therefore one signal strip cannot be utilized for an index occupying the full length of the pocket and usually not more than half the pocket length. Recourse has therefore been made to the provision of two sliding signals, movable in opposite directions, with attendant difficulties in manufacture and operation.

According to the present invention, the problem of utilizing the entire edge of the record card for progressive and visible signalling purposes is solved by the provision of a signal member whose length is substantially equal to the width of the card, and by providing the signal member with spaced projections which may be collectively and selectively displayed or concealed over the entire width. These spaced projections may be positioned to cooperate with any one, or all, of the index divisions, on a card margin, so that one signal member may be employed for the card, and the index on the card margin may be as long as the card width. Accordingly, a greater range and variety of signalling operations are obtained with the signal of the present invention.

Typical forms and applications of the invention are illustrated in the accompanying drawings, wherein.

Figure 1:
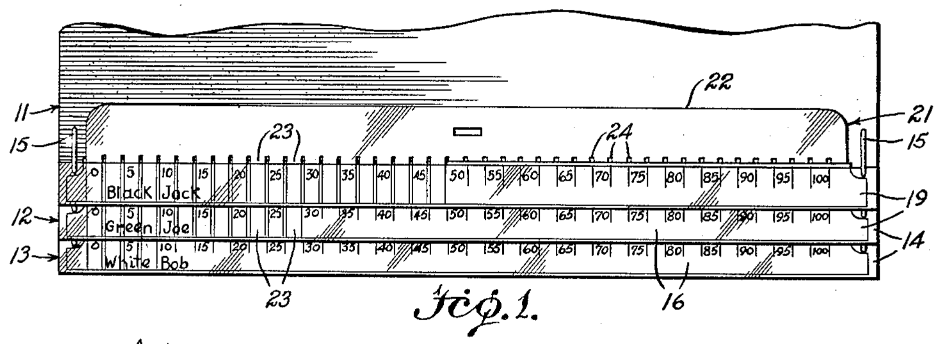
Figs. 1, 2 and 3 are fragmentary elevations of offset superimposed and visible record cards to which the invention is applied, and respectively illustrate various ways in which the invention may be utilized.
Figure 2:
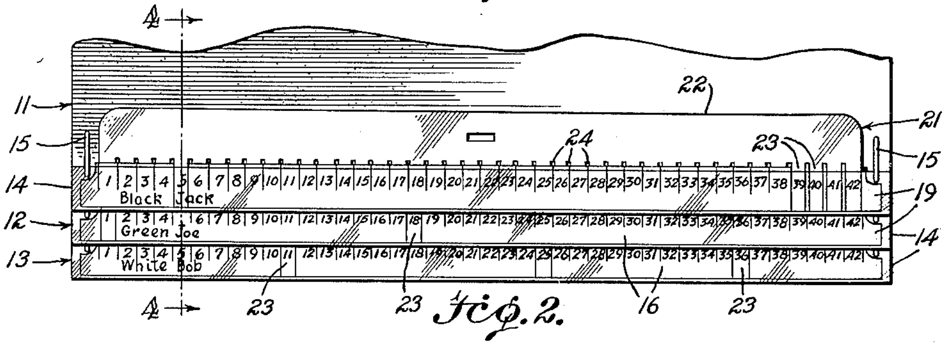
Figure 3:
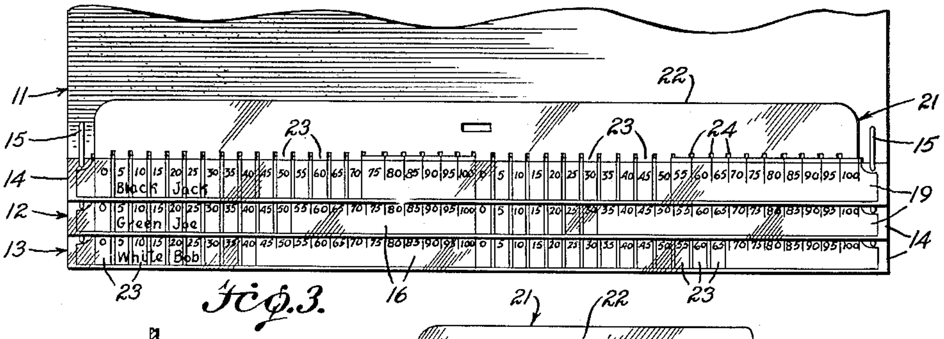
Figure 4:
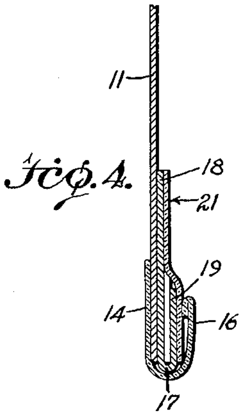
Fig. 4 is a section on line 4—4 of Fig. 2.

The invention is illustrated in Figs. 1, 2 and 3 as applied to a known type of visible record, wherein a number of card holders 11, 12 and 13 are superimposed in overlapping offset relation with their free margins in visible index relation. Each card holder is provided with a sheath or tip 14, formed of transparent plastic material, which embraces the lower free edge of each card holder and is secured thereto by stitches 15 at the ends. The surface of the card holder may be directly employed to receive business entries, or it may be made as the support for a detachable record card, as is well understood in the art. The space between the front face 16 of the sheath 14 and the face of the card 11 constitutes an open pocket, in which may be positioned the lower edges of detachable record cards, folded title inserts, signals, and the like. As thus far described, the construction is characteristic of a well known type of visible record, and therefore a more extended discussion of this phase of the disclosure is deemed unnecessary.

In the herein illustrated forms of the invention, it is proposed to place in the tip 14 a folded title insert strip 17 having a long rear fold portion 18 and a short front fold portion 19, made by folding the index along its length. It should be understood that the lower margin of the record card itself may be used instead of an insert. The front portion 19 of the insert is of such width that it projects only slightly beyond the upper edge of the face 16 of the pocket 14, while the long portion 18, in an independent insert, need not be much longer, and no wider in fact than the signal member hereinafter described.

The exposed face of the front portion 19 is suitably divided into indexing divisions, which may establish any desired scale or series of informative legends. In Fig. 1, the index is shown as representing a scale from 0 to 100 in marked divisions of five units. The scale is printed on front portion 19 and extends entirely across the insert. In Fig. 2, the index is arbitrarily divided into forty-two divisions, also extending across the entire face of the insert. In Fig. 3, the index is repeated from the left margin to the center and the center to the right hand margin. In all cases, the index as a whole extends entirely and continuously across and is printed on the insert, so that the entire width is made available for signalling purposes. Such an index, it will be recalled, cannot be covered by a single sliding signal, as half the span must be allowed to receive the sliding signal strip.

Figure 5:
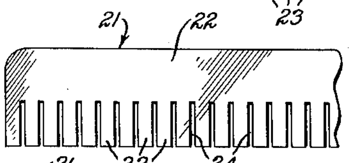
Fig. 5 is a fragmentary plan of one form of signal.
Figure 6:
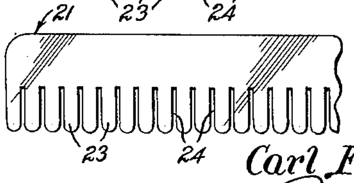
Fig. 6 is a fragmentary plan of a modified form of signal.

The signal member of the present invention is shown in Figs. 5 and 6 as a comb-like strip of transparent plastic 21, of any desired color, having a substantially continuous back 22 and a plurality of depending teeth or projections 23. The lower edges of the teeth in Fig. 5 are straight, whereas in Fig. 6 they are shown as round to facilitate manipulation. Otherwise the two forms are the same. Each strip has a length such that it will extend entirely across the indexed portion of the card when the strip is placed in the pocket 14. The teeth 23 are made about as wide as the index divisions, and are of course spaced at the same intervals. The slots 24 between the teeth 23 are cut to a depth so that, when the signal strip is inserted in the pocket 14, the bottoms of the slots will just clear the upper edge of the front portion 19 of title insert 17.

It will be seen from the illustrations that the signal 21 is inserted in the pocket vertically, rather than lengthwise, and that as many of the teeth 23 may be placed in front of the front portion 19 as desired, while the remaining teeth are obscured because they are covered by the front portion 19 of the insert. Accordingly, the signal may be set up to convey information visually across the entire card face, and at various portions thereof. Readjustment of the signal is effected simply by removing the entire member, or one end thereof, and springing the teeth either into displayed or obscured position, as the situation requires.

For the record index form shown in Fig. 1, the teeth are displayed progressively as the card entries show an increase in the scale value. An index based on a scale of 100 may be employed for various purposes. For example, let it be assumed that the names on the cards 11, 12 and 13 are those of salesmen each having an assigned quota of business. The signals here show that "Mr. Black" has achieved forty-five percent of his volume as of the date of posting the signals, while "Mr. Green" has reported twenty-five percent, and "Mr. White" has only reached five percent. The same type of index may be employed for a record showing the status of production on various parts, and for many other purposes.

The combination delineated in Fig. 2, instead of contemplating a progressive signal across the face of the record, reflects isolated signals, such, for example, at points 5 and 39 to 42 on card 11; at point 18 on card 12; and at points 11, 25, and 36 on card 13. This may typify a record of what some particular customer habitually buys, or should be ready to buy. In this case, the index numbers would be employed as a code to the various items which the manufacturer has available for sale.

In Fig. 3, the teeth 23 are set up in groups over a repeated index scale, wherein the left hand signal on card 11 shows seventy percent and the right hand signal shows fifty percent. The signal may thus be employed to reflect two conditions existing in the record simultaneously. This double scale may be used to indicate conditions on two different records in the same card holder. It may be used to show figures for one period in comparison with those for another, as well as in many other ways in record keeping. An obvious variant of this type would be the employment of the left hand index for the months of the year, and the right hand index for the days of the month, thus showing specific dates.

It is believed that the foregoing applications of the signal and index will show the wide utility for the invention, and the numerous ways in which it may be employed. It is therefore not intended to restrict the invention to the specific examples given by way of illustration, as the scope of the invention should be considered commensurate with that of the following claims.

The invention claimed is:

1. In a visible index, an index strip having a visible margin provided with index indicia, a signal member for the index comprising a flexible flat plastic strip having a length substantially equal to that of the index strip, and a plurality of adjacent spaced independent signal tabs formed along one margin of the plastic strip, said signal member being adapted to have said tabs selectively engaged in lateral sliding relation over opposite sides of the visible margin of said index strip for signalling cooperation of selected tabs on the outer side of said strip with said indicia.

2. An index device comprising an insert strip formed with a short fold portion carrying an index scale along one margin thereof, and a signal member formed of a strip of a length equal to said indexed margin having a margin formed with transverse slots spaced according to said index and forming spaced tabs equal to the number of indexes in the scale on said strip and adapted to be selectively positioned on either side of said index margin in the support of said signal on said margin for progressive signalling cooperation with the scale divisions of the index on said margin.

3. In a visible index the combination of a card having an index along a free margin thereof, a signal strip having a length equal to the index on said free margin, wider than said free margin and having a side margin at least equal in width to said indexed free margin formed with tranverse slots to form a plurality of flexible signal projections throughout the length thereof equal in number to the indexes on said free margin of each aligned with one of the indexes, said signal strip having lateral sliding engagement on said card margin with said signal projections selectively engaged on opposite sides of said card margin for frictionally retaining said signal strip on said card whereby the projections engaged over the indexed margin of said card have progressive signalling cooperation with aligned indexes on said free margin, and means for retaining said signal in a fixed relation for aligning said indexes and signal projections.

4. In a visible index, an index card, a folded transparent sheath embracing the lower margin of said card, a title insert formed of an elongated strip engaged between said sheath and the adjacent margin of said card and having a marginal portion extending beyond the edge of said sheath over said card, said insert having indicia extending across the exposed portion engaged in said sheath, a flexible transparent signal formed of margin to form a plurality of parallel signal projections equal in number and position to said indicia throughout the length of said strip, said signal strip having said signal projections seleca long narrow strip of uniform cross-section having one longitudinal margin formed with slots extending perpendicular to the edge of said tively engaged over opposite sides of said title insert for signalling cooperation of the signal projections on the outer side of said title insert with the indicia thereon, said projections engaging between said sheath and insert whereby said sheath cooperates to retain said signal in engagement with said insert over said margin of said card, and means for retaining said signal with said projections aligned with corresponding indicia against endwise movement.

5. In combination, a signal formed of a long narrow strip of transparent sheet material having one margin on a long side slotted perpendicular to the edge at a plurality of spaced positions into the central portion of said strip to form a plurality of signal projections along said one margin, and an index strip of a length equal at least to the length of said signal having index indicia on one margin in spaced relation corresponding to the projections on said signal, said margin of said index strip being insertable into selected slots in said signal for selectively displaying one or more of said projections over the indicia thereon and concealing the remainder on the opposite side of said index strip for progressive signalling cooperation.

CARL F. WOLTERS.

REFERENCES CITED

The following references are of record in the file of this patent:

UNITED STATES PATENTS

| Number | Name | Date |
|---|---|---|
| 1,645,598 | Johnston | Oct. 18, 1927 |
| 1,768,292 | Power | June 24, 1930 |
| 2,061,675 | Schade | Nov. 24, 1936 |
| 2,279,189 | Uhlir | Apr. 7, 1942 |
| 2,449,576 | Attwood | Sept. 21, 1948 |